United States Patent  (10) Patent No.: US 9,493,967 B2
Basavarajappa et al.  (45) Date of Patent: Nov. 15, 2016

(54) FUEL TANK CAP LOCK

(75) Inventors: Madhu Basavarajappa, Düsseldorf (DE);
(Continued)

(73) Assignee: Kiekert Aktiengesellschaft, Heiligenhaus (DE)

(*) Notice: Subject to any disclaimer, the term of this patent is extended or adjusted under 35 U.S.C. 154(b) by 312 days.

(21) Appl. No.: 14/238,941

(22) PCT Filed: Jul. 7, 2012

(86) PCT No.: PCT/DE2012/000687
§ 371 (c)(1),
(2), (4) Date: Jul. 2, 2014

(87) PCT Pub. No.: WO2013/013653
PCT Pub. Date: Jan. 31, 2013

(65) Prior Publication Data
US 2014/0319846 A1    Oct. 30, 2014

(30) Foreign Application Priority Data

Jul. 22, 2011 (DE) .......... 10 2011 108 154
Aug. 15, 2011 (DE) .......... 10 2011 114 659
Oct. 18, 2011 (DE) .......... 10 2011 116 068

(51) Int. Cl.
*E05C 5/04* (2006.01)
*E05B 83/34* (2014.01)
(Continued)

(52) U.S. Cl.
CPC .............. *E05B 83/34* (2013.01); *B60K 15/05* (2013.01); *E05C 19/022* (2013.01);
(Continued)

(58) Field of Classification Search
CPC .......... B60K 15/05; B60K 2015/0576; B60K 2015/0561; B60K 2015/0584; B60K
(Continued)

(56) References Cited

U.S. PATENT DOCUMENTS 3,397,000 A    8/1968 Yoshitaka
8,845,001 B2 * 9/2014 Kotama .............. B60L 11/1818
                                                    296/97.22
(Continued)

FOREIGN PATENT DOCUMENTS

DE    19747707    5/1999
EP    1018588    7/2000
GB    2149447    6/1985

OTHER PUBLICATIONS

International Search Report for corresponding patent application No. PCT/DE2012/000687 dated Jun. 12, 2013.
(Continued)

*Primary Examiner* — Mark Williams
(74) *Attorney, Agent, or Firm* — Renner, Otto, Boisselle & Sklar, LLP (57) ABSTRACT

The invention relates to a lock for a fuel tank or tailgate in a vehicle, comprising a locking bolt (1) which can be adjusted between an open and closed position by opening and closing the cap or the tailgate. Said cap lock, in the housing (2) of the locking device, is positively driven counter to the force of a compression spring (4) in the direction of its longitudinal axis (6) and counter to the force of a torsion spring (3) about its longitudinal axis (6).

12 Claims, 10 Drawing Sheets (75) Inventors: Hendrik Wahmann, Düsseldorf (DE)

(51) Int. Cl.
*B60K 15/05* (2006.01)
*E05C 19/02* (2006.01)

(52) U.S. Cl.
CPC .... *B60K 2015/053* (2013.01); *Y10T 292/0864* (2015.04); *Y10T 292/0868* (2015.04)

(58) Field of Classification Search
CPC .................. 15/04;B60K 2015/0422; B60K 2015/0515; B60K 2015/0546; B60K 15/0409; B60K 2015/0569; E05B 83/34; Y10S 220/33
USPC .......................................................... 292/58
See application file for complete search history.

(56) References Cited

U.S. PATENT DOCUMENTS

| | | | |
|---|---|---|---|
| 9,038,499 B2 * | 5/2015 | Ishiguro | B60K 15/05 220/315 |
| 2001/0050486 A1 | 12/2001 | Bunting | |
| 2010/0045049 A1 * | 2/2010 | Persiani | B60K 15/05 292/14 |

OTHER PUBLICATIONS

Written Opinion for corresponding patent application No. PCT/DE2012/000687.
International Preliminary Report on Patentability for corresponding patent application No. PCT/DE2012/000687 dated Jan. 28, 2014.

* cited by examiner

FUEL TANK CAP LOCK

The invention relates to a lock for a fuel tank cap or tailboard in a vehicle with a locking bolt which can be shifted between an open and closed position by opening and closing the fuel tank cap and tailboard.

Locks for fuel tank caps are for example known from DE 10 2011 076 810. The fuel tank cap is closed manually when the filling process is complete, a force is exerted on a locking bolt; consequently, this shifts from its extended open position to its retracted closed position. When the fuel tank cap is activated, the bolt is simultaneously rotated about its longitudinal axis and thus fixed in the fuel tank cap at its end facing the fuel tank cap meaning that closure occurs. The mechanisms previously used in this context have a very complicated structure and encompass a multitude of components. Consequently, one of the implications of this is that comparatively strong drives are necessary for the closure process which is generally controlled via the central locking. The multitude of individual components with a complicated structure also leads to high installation costs and considerable susceptibility to malfunction. Tailboards must be understood to mean especially covers for charging sockets in an electric vehicle for the recharging of batteries.

The present invention therefore sets the task of creating a lock for a fuel tank cap or tailboard in a vehicle with a minimum number of components in order to simplify installation, reduce susceptibility to malfunction and to be able to use smaller drives to operate this lock.

This task is solved by the locking bolt in the housing of the lock being forcibly actuated against the force of a compression spring in the direction of its longitudinal axis and against the force of a torsion spring around its longitudinal axis.

This formation and positioning of the locking bolt results in an especially compact lock for a fuel tank cap or tailboard in a vehicle which manages with a minimum number of components. For this purpose, the locking bolt in the housing of the lock which can be moved between an extended open position and a retracted closed position is forcibly actuated in the movement from the open to the closed position and back again. A compression spring acting in the longitudinal axis direction of the locking bolt and a torsion spring with the same action lead to a direct and effective movement of the lock between the different positions in interaction with this forcible actuation.

The forcible actuation is located between the locking bolt and the housing in the form of a gate which is assigned to the locking bolt and/or the housing. Expediently, it is envisaged that a self-contained, all-round gate serves on its lateral surface in relation to the locking bolt as part of the forcible actuation.

A pin conducted in the gate on the lateral surface of the locking bolt serves as a companion piece to this gate on the housing side in relation to the housing as forcible actuation. This is always forcibly actuated in the self-contained gate which is formed in a track shape. Consequently, it always passes through the gate again when the locking bolt is shifted.

When the locking bolt is shifted between the open and closed position, it shifts on the specified, all-round gate, for which purpose this gate has two opposite sections which are fundamentally at a diagonal. These diagonal sections are comparatively long because they depict the path ultimately described by the locking bolt between the open and closed position in conjunction with the compression spring orientated in the direction of the longitudinal axis and the torsion spring acting around this axis.

An unwanted opening of the fuel tank cap or tailboard is prevented if a gate section serving to secure a holding position of the locking bolt in its closed state is provided between the two diagonal sections. This is especially advantageous when the activation of the flap is too firm or too long, because the relevant gate section enables a kind of intermediate position of the pin conducted into the gate. This prevents the locking bolt unwantedly shifting from the retracted position corresponding to its closed position with simultaneous opening of the fuel tank cap or tailboard.

As the pin on locking bolts is in the closed position at the upper end of the gate, it is necessary for the gate section to be provided at the upper end of the gate. The section therefore extends to the upper transition between the two diagonal gate sections.

An especially preferred execution form of the invention envisages that the gate section is fundamentally v-shaped. This implies that the gate section for security purposes has two flanks arranged diagonally in a 'V' shape which can demonstrate a crosswise transition at their lower ends by the pin being located in the closed position of the locking bolt.

In other words, the gate section should have two diagonal sections arranged displaced to one another and a horizontal section connecting these in order to attain this additional securing position in the gate.

A supplementary proposal envisages that the fuel tank cap or tailboard is formed correspondingly to the gate section. This implies for example that a seal, preferably a rubber or plastic seal, is located on the fuel tank cap which holds the locking bolt in the secured position in the gate section.

At the same time, the gate includes sections in which the shifting of the locking bolt only occurs in a horizontal direction against the force of the torsion spring and in a vertical direction against the force of the compression spring. In the area of these sections, the respective conversion between the opening and closing process takes place by the extension or retraction of the locking bolt. In this context, it is envisaged that the diagonal sections at the upper end of the gate are connected with a horizontal section and/or a vertical section. This forms the transition to the closure position of the locking bolt. In this regard, in this transition and in this sequence a horizontal, then a vertical and then another horizontal section are arranged.

Additionally, it is proposed that the diagonal sections at the lower end of the gate are connected by means of a horizontal transition. This transition leads over into the open position of the locking bolt again.

The torsion spring and its arrangement and formation are crucial for the realisation of the present invention. A key advantage in this regard is that the formation and/or bearing of the torsion spring in the housing of the lock enables exertion of pretension in both directions of action of the torsion spring. This means that, dependent on its positioning, the torsion spring can muster force in both directions of action, clockwise and anticlockwise, in order to thus also have an impact on the shifting of the locking bolt back into its open position. Consequently, the bearing of the torsion spring is such that it pretensions itself to a certain extent during rotation in one direction. Consequently, sufficient force can then be mustered during the subsequent rotation caused by the gate in the opposite direction.

In order to attain this objective, the torsion spring is supported on the lock housing and the locking bolt and/or a pivoting lever firmly connected to the locking bolt. In a preferred formation, the locking bolt forms a structural unit with this pivoting lever, which in turn corresponds with the formation and bearing of the torsion spring. This means that the torsion spring is supported in the respective positions on the one hand on the housing side and on the other hand via the pivoting lever connected to the locking bolt and exerts the necessary moment on the locking bolt in its shifting between the closed and open position.

For the purpose of this support, the pivot lever has an end stop for the torsion spring. By means of the pivoting lever during its shifting, the locking bolt carries a crosswise handle provided at the ends of the torsion spring in each instance via the end stop on the pivoting lever. Fixtures on the housing side also ensure the relevant end stop respectively.

Concerning the transition from the closed into the finally locked position, it is envisaged that a ratchet equipped with a drive serves to lock the fuel tank cap. The ratchet can block the pivoting lever when the fuel tank cap is locked and thus prevent shifting of the locking bolt. This mechanism is also of a comparatively simple and therefore effective construction because only this ratchet needs to be switched from a neutral position into a position in which it prevents shifting of the locking bolt due to the advantageously particularly small drive.

In addition to this, it is envisaged that the ratchet is kept in the closed position by a spring. The spring acts in such a way that the ratchet is pressed against the pivoting lever which is in an operative connection to the lock. On the one hand, the spring can block the movement of the pivoting lever, whereby the ratchet acts against the pivoting lever with a groove and on the other hand the ratchet can also only press against the pivoting lever by means of the spring. Consequently, the ratchet fits closely to the pivoting lever. Especially in the case where the ratchet fits closely against the pivoting lever, an advantage of the invention is apparent, namely that the fuel tank cap can be locked when the fuel tank cap is still open. If the lock is activated when the fuel tank cap is still open, a drive moves the ratchet into a position in which the ratchet does not block a movement of the pivoting lever, but closely fits against a surface of the pivoting lever. The lock is active in this state, but the fuel tank cap is open. Only when the fuel tank cap is closed does the pivoting lever move into a position in which the ratchet blocks a movement of the pivoting lever. It is preferable that a free end of the pivoting lever acts together with a recess in the ratchet.

A further advantageous execution form of the invention envisages that the lock is equipped with a detection device for the opening state of the fuel tank cap or tailboard. It can be ascertained via this detection device whether the fuel tank cap or tailboard is open or closed. In conjunction with a visual and/or acoustic display which may be equipped with an alarm function and is for example integrated into a vehicle dashboard, it can be indicated to the driver whether the cap or tailboard is open or closed, especially whether he has unintentionally driven off with an open or not completely closed cap or tailboard.

As part of a comparatively cost-effective implementation, it has been taken into consideration for example that a switching device which records the position of the locking bolt and/or pivoting lever acts as a detection device. Via the switching device which is formed as a microswitch for example, it can be directly or indirectly realised in particular whether the locking bolt is in the retracted or extended position. Its change in position is known to be associated with a twisting of the locking bolt and thus also the pivoting lever as a result of activation of the fuel tank cap, consequently via a recording of the position of the locking bolt and/or pivoting lever by the switching device it can be concluded whether the fuel tank cap is open or closed. To this end, the pivoting lever is formed corresponding to the switching device, for example. After an execution, the pivoting lever shows a projection in the area turned towards the switching device via which the switching device is activated.

An alternative to such a switching device envisages that an echo sensor serves as a detection device in conjunction with a permanent magnet. The movement of the permanent magnet is recorded via the echo sensor. There is relevant signalling which provides information on the state of opening of the fuel tank cap in conjunction with the present invention. An advantage of the echo sensor in conjunction with the permanent magnet is the contactless function between the sensor and the magnet.

This is the case in particular when the echo sensor or permanent magnet is assigned to the locking bolt and/or the pivoting lever. As already mentioned above, the position of the locking bolt or the pivoting lever provides information on the state of opening of the fuel tank cap, consequently the retrieval of the locking bolt and/or the pivoting lever is especially advantageous, particularly as it can take place in a protected form in the housing of the lock.

This control can also be advantageously used in another way, if namely the detection device corresponds to a light unit arranged in the area of the fuel tank cap. Because it can be recorded via the detection device whether the fuel tank cap has just been opened and illumination of this surrounding area is therefore sensible, the light unit can also be controlled via the detection device, the switching of which is integrated into the display system via stamping grids, for example. Especially where visibility conditions are unfavourable, this simplifies the fuelling or recharging of batteries of electric vehicles. The light unit can also or alternatively be used to provide information on the charging state, for example, especially in conjunction with such a battery. This means that the charging state of the battery can be displayed to the driver when the fuel tank cap is open.

The invention is characterised in particular by the fact that a lock is created for a tailboard or a fuel tank cap in a vehicle which manages with a minimum both in relation to the number and dimension of the necessary components. A locking bolt which can be shifted between an extended open and a retracted closed position which is force-impelled via a gate opposite the housing of the lock is crucial for this. To this end, in relation to the locking bolt a self-contained, all-round gate serves and a pin conducted in this gate in relation to the housing. In an interplay between a torsion spring and a compression spring, the barrel of the pin is controlled in the gate via the forcible actuation and the return to the start position is guaranteed. Diagonal sections of the gate are overcome against the force of torsion and compression springs, horizontal sections only against the torsion springs and vertical sections only against the compression springs. In the process, the torsion spring is assigned the significance of exerting pre-tension in both directions of action clockwise and anticlockwise, respectively at the upper and lower end of the gate in the area of the transitions positioned there. Tailboards are understood to mean in particular covers for charging sockets in an electric vehicle to recharge batteries which are used in electric vehicles alternatively to tank covers. The lock in accordance with the invention can also be used to lock the connections between the charging plug and the charging socket during the charging process of an electric vehicle.

Other details and advantages of the object of the invention result from the following description of the pertaining sketch which depicts a preferred execution example with the necessary details and individual components. Here is an overview of what is depicted in the individual figures.

FIG. 1 shows the view of the inside of a lock with a locking bolt 1 in open position. Only a section of the housing 2 with a relevant reference sign is shown for better illustration. The locking bolt 1 has a gate 5 on its lateral surface 7 which acts as forcible actuation 8 between the locking bolt 1 and the housing 2 in interplay with the pin 18. For functional supplementation, a torsion spring 3 is provided for which surrounds the locking bolt 1 in the area of a pivoting lever 22. The drive in the form of a motor for the ratchet 25 is described with the reference sign 24 via which the locking bolt 1, or more precisely the pivoting lever 22 is secured against further activation in the locked position. Two handles 27, 28 help to support the torsion spring 3 to generate pre-tension in conjunction with the ratchet 23 on the pivoting lever 22. A possible emergency unlocking device is not shown.

Figure 1:
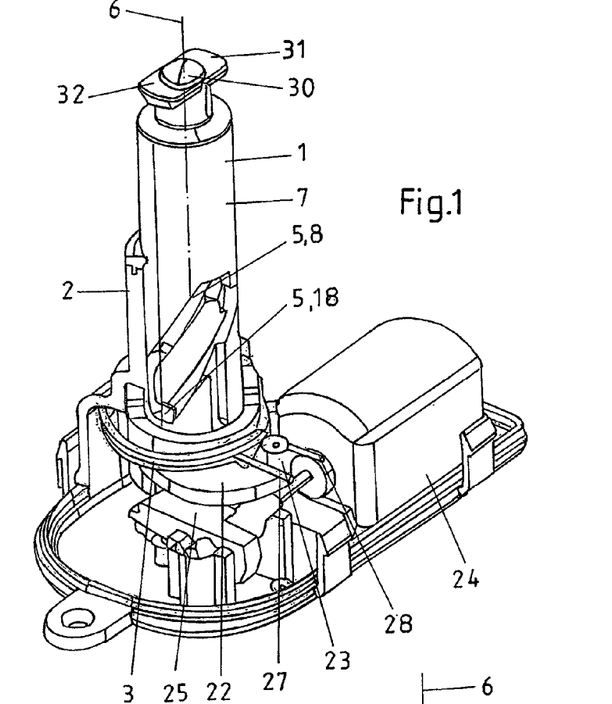
FIG. 1 the view into the lock housing with the locking bolt in the open state
Figure 2:
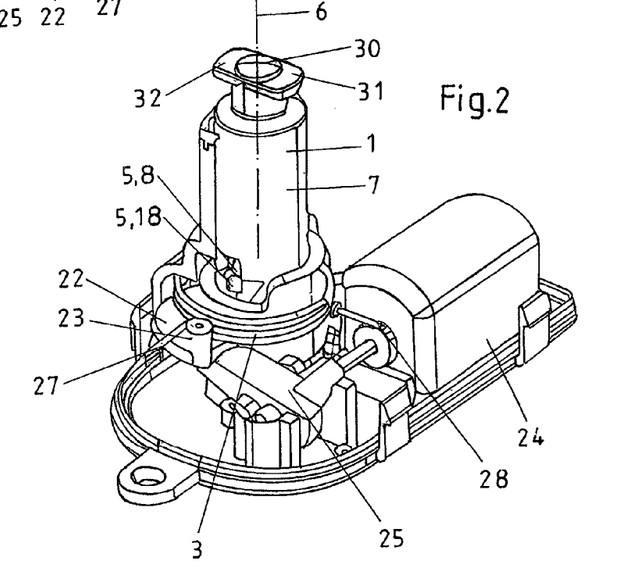
FIG. 2 the depiction in accordance with FIG. 1 with the locking bolt in the closed state FIG. 3 the locking mechanism in the closed state with the locking bolt in the closed position FIG. 4 the locking mechanism in the unlocked state with the locking bolt in the closed position FIG. 5 the locking mechanism in the closed state with the locking bolt in the closed position FIG. 6 the locking mechanism in the unlocked state with the locking bolt in the open position FIG. 7 a locking bolt with a gate FIG. 8 a diagram for the shifting of the locking bolt FIG. 9 a locking bolt with a pivoting lever FIG. 10 the top view into the housing with a torsion spring when the locking bolt is in the open position FIG. 11 the depiction in accordance with FIG. 9 with the locking bolt in the closed position FIG. 12 the lock housing with a microswitch with the fuel tank cap or tailboard closed FIG. 13 the lock housing with a microswitch with the fuel tank cap or tailboard open FIG. 14 the lock housing with an echo sensor with the fuel tank cap or tailboard open FIG. 15 the lock housing with an echo sensor with the fuel tank cap or tailboard closed FIG. 16 a diagram for the shifting of the locking bolt with a safety catch and FIG. 17 a locking bolt with a gate with a safety catch

In the illustration in accordance with FIG. 2 the locking bolt 1 was moved into its closed position, i.e. pressed downwards in the direction of its longitudinal axis 6. This was achieved via the tailboard or fuel tank cap which is not recognisable here with which the locking bolt 1 is in contact at its upper end 29. The mechanism 30 with the two wings 31 and 32 via which the locking bolt 1 meshes with the tailboard or fuel tank cap is responsible for this. If the latter is closed, the locking bolt 1 is shifted in the direction of the longitudinal axis 6 and around this axis 6 to a simultaneous twisting into the position depicted in FIG. 2. It is also recognisable that the torsion spring 3 or more precisely the handles 27 and 28 have changed their positions; the pre-tension is now generated in an anticlockwise direction via the handle 27.

Figure 3:
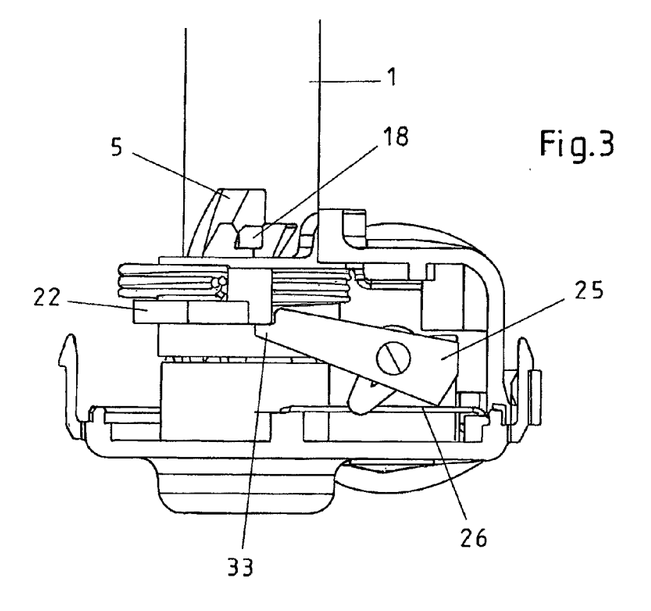

FIGS. 3 to 6 depict the locking mechanism in accordance with the invention in four different positions. In FIG. 3, the lock mechanism is initially shown with a closed tailboard or fuel tank cap and the locking bolt 1 is shown in the retracted closed position. The ratchet 25 which can be controlled via the drive concealed here is recognisable which blocks the pivoting lever 22 and thus the locking bolt 1 at its front end 33; the lock is closed. The ratchet 25 is supported by the spring 26 or the ratchet 25 is kept taut with the force of the spring 26. The pin 18 is in the upper area of the gate 5.

Figure 4:
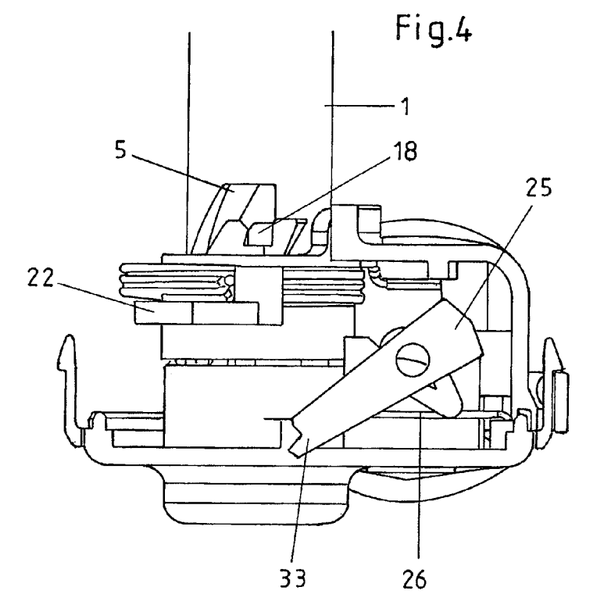

In the illustration in accordance with FIG. 4 the lock is now not closed, but the locking bolt 1 is also in the lower closed position. However, the ratchet 25 is not meshed with the pivoting lever 22. Consequently, there is no longer any resistance in this regard; the lock is not locked with a locking bolt 1 in the closed position. The pin 18 is in the upper area of the gate 5.

Figure 5:
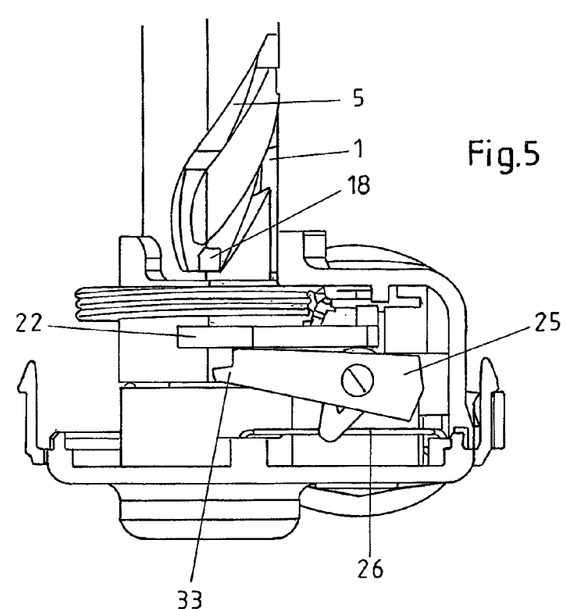

FIG. 5 shows a locked locking mechanism, however with a locking bolt 1 in its upper opening position, the flap is therefore open with the lock locked. Although the ratchet 25 is in the position as corresponds basically to FIG. 3 which is practically ineffective however due to the open locking bolt 1. The pin 18 is in the lower area of the gate 5.

Figure 6:
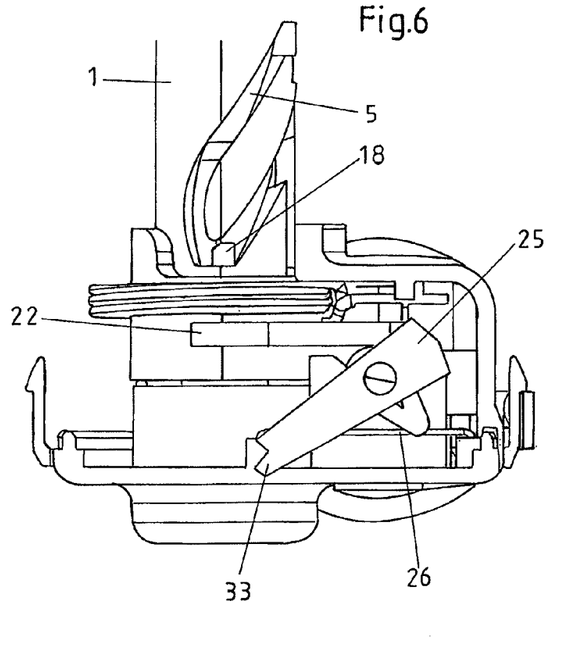

Finally, FIG. 6 shows the locking mechanism with the lock open and the locking bolt 1 in the upper open position. Only when the flap is closed in which the locking bolt 1 is activated can the ratchet 25 mesh with the pivoting lever 22. During the closure, the pivoting lever 22 executes a rotary movement and the ratchet 25 glides past the pivot lever 22 until the ratchet 25 reaches and engages into a free end of the pivoting lever 22. In the engaged position the ratchet 25 then locks the pivoting lever 22, consequently the closed fuel tank cap is locked. The pin 18 is located on the lower section of the gate 5.

Figure 7:
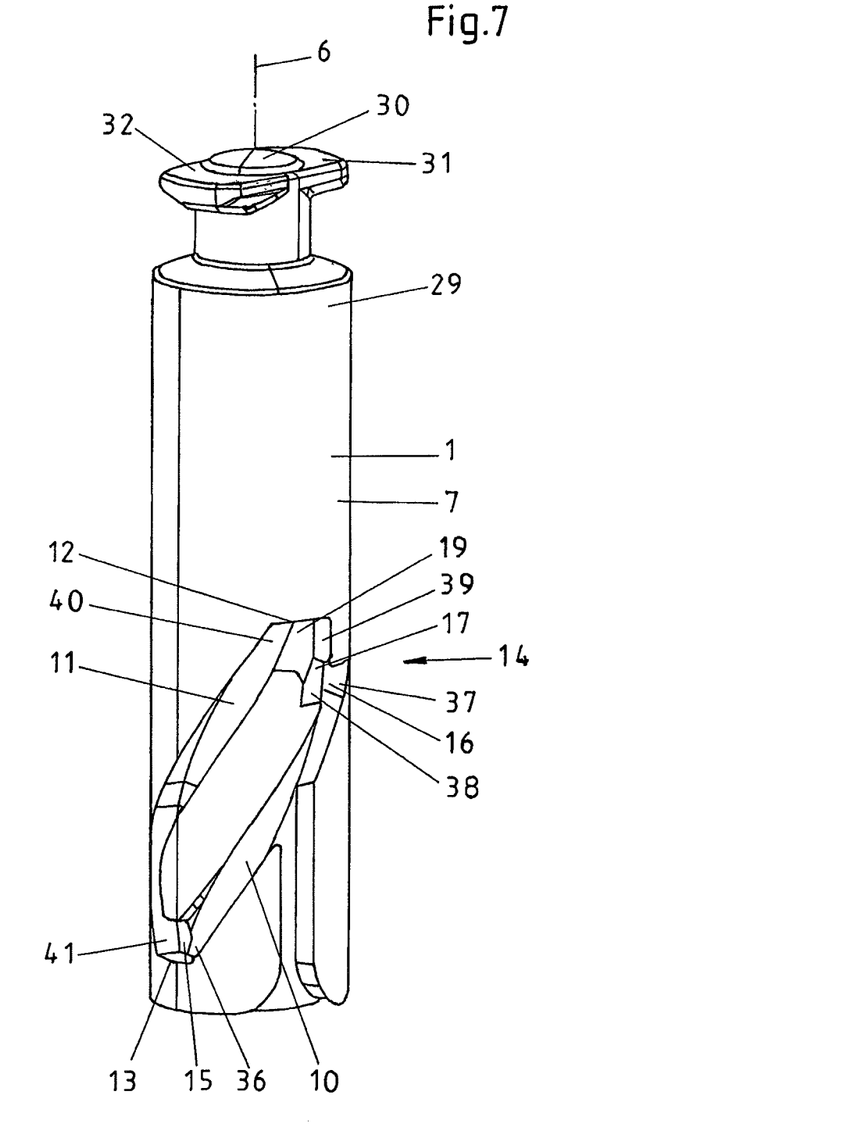

The object of FIG. 7 is the locking bolt 1 with the mechanism 30 and the two wings 31, 32 at its upper end 29 and the self-contained gate 5 on the lateral surface 7 of the locking bolt 1. The reference signs 36 to 41 illustrate six positions on or in the gate 5 as they depict the forcible actuation 8 on the bolt side in interplay with the pin on the housing side which is not illustrated here. 36 describes the lowest position at the lowest end 13 of the gate 5. If the pin is situated there, the locking bolt 1 is in its open position and is therefore extended. If this now passes the diagonal section 10 when the locking bolt 1 is activated, it initially reaches position 37 which it attains by activation against the force of the torsion and compression spring. Against the force of the latter, the pin then reaches position 38 via the horizontal section 16 in the area of the transition 14; the locking bolt 1 is now in its closed position, i.e. retracted. From there, the pin reaches the position 39 at the upper end 12 of the gate 5 against the force of the compression spring via the vertical section 17 of the transition 14; the pin reaches this position when a force is exerted on the closed fuel tank cap, i.e. the fuel tank cap is activated from its closed position in the direction of the vehicle. In turn, a horizontal section 19 is connected to this, at the end of which position 40 is located. From there, the pin reaches the lower position via the second diagonal section 11 which is located opposite the first diagonal section 10 and which is described with the reference sign 41 and which corresponds in turn to a locking bolt in the open position. There, at the lower end of the gate 5 a horizontal transition 15 between the points 36 and 41 is described in turn.

Figure 8:
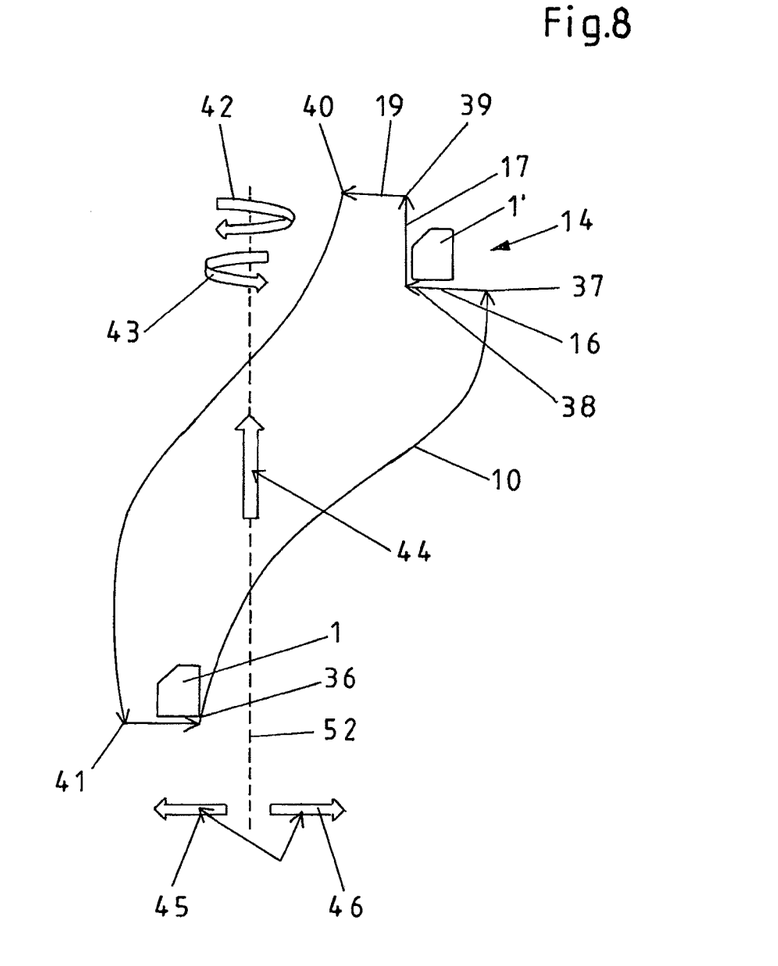

This mechanism is also illustrated by FIG. 8. The first position described with 36 corresponds to an open locking bolt 1 or an open flap. The diagonal section 10 up to position 37 is connected to this. From here, the pin reaches closed position 38 via the transition 14. This transition 14, symbolised by the reference sign 1' for the locking bolt in the closed position initially consists of a horizontal section 16 between the points 37 and 38 a connected vertical section 17 between the points 38 and 39 and finally a further horizontal section 19 between the points 39 and 40. In turn, a diagonal section 11 is connected between the points 40 and 41 which passes the pin in the return supported by the springs. In turn, there is a horizontal transition 15 between the points 41 and 36. With the arrows 42, 43 the rotation of the locking bolt 1 is described around the longitudinal axis, with arrow 44 the force of the compression springs and with the arrows 45 and 46 the force mustered by the torsion spring 3. The dotted line located in the centre between arrows 45 and 46 constitutes a zero line of the force of the torsion spring 3. In the area of the dotted line, no force from the torsion spring 3 acts on the pivoting lever 22. It can be clearly recognised that a force can be attained in different directions using the torsion spring 3, i.e. the torsion spring 3 generates a force in a clockwise direction and then a force in an anticlockwise direction, in other words the torsion spring 3 can generate a force in a negative and a positive direction, according to which position the locking bolt 1 is in.

Figure 9:
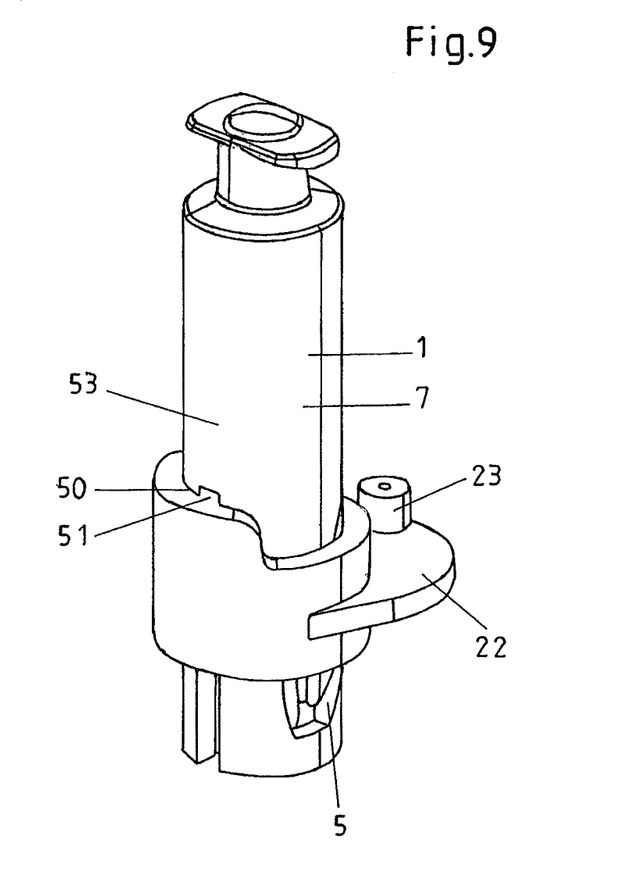

FIG. 9 shows a locking bolt 1 with a pivoting lever 22 whereby this depiction illustrates the structural unit formed by the locking bolt 1 and the pivoting lever 22. With its end stop 23 the pivoting lever 22 serves especially for the transmission of torque exerted via the locking bolt 1 on the torsion spring 3 not illustrated here. Force transmission from the pivoting lever 22 in direction onto the locking bolt 1 or vice versa occurs for example via the depicted interlocking connection in the form of a groove 50 and bolt 51 connection on the end 53 of the locking bolt 1 located diametrally opposite the end stop.

Figure 10:
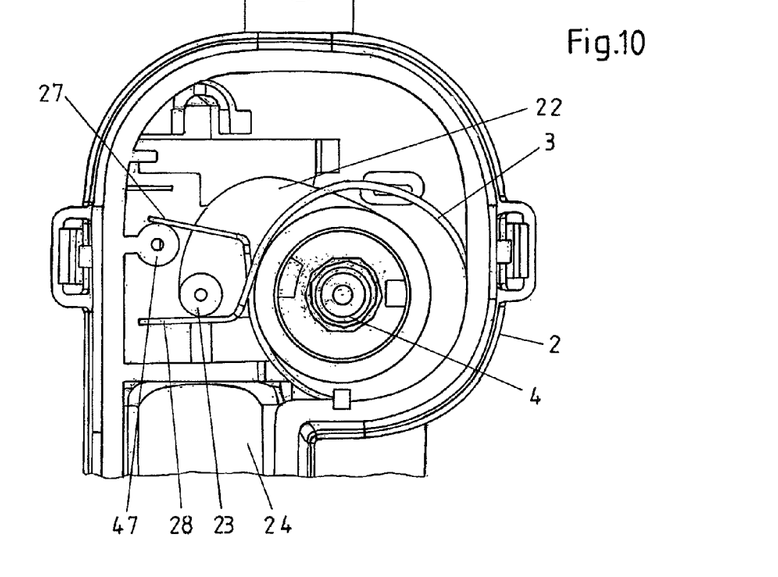
Figure 11:
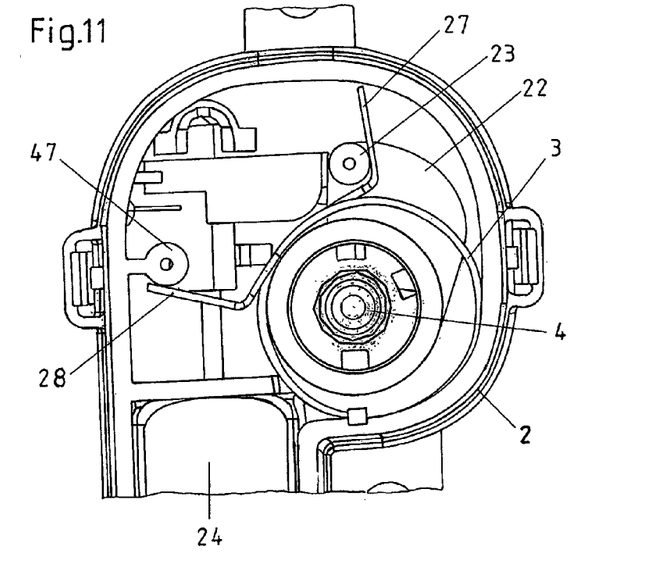

The function of the torsion spring 3 is also explained in the illustrations from FIGS. 10 and 11. Initially, FIG. 10 shows the locking mechanism in the open position of the locking bolt not shown here. The torsion spring 3 is pre-stressed in a clockwise direction, between its two handles 28 and 27 the end stop 23 can be recognised on the pivoting lever 22. The compression spring 4 arranged in the lower area of the locking bolt 1 is described with 4.

This has now changed in the illustration in accordance with FIG. 11, by activation of the locking bolt 1 the pivoting lever 22 and end stop 23 have also turned, whereby the end stop 23 carried the handle 27 against the force of the torsion spring 3, whereby it simultaneously enables an end stop 47 of the torsion spring 3 on the housing side to generate the relevant pre-stressing anticlockwise. Thanks to this arrangement and formation of the torsion spring 3 the return of the locking or closure bolt 1 into the open position is always possible in interplay with the compression spring 4 and the gate 5 which can be described as hysteresis.

Figure 12:
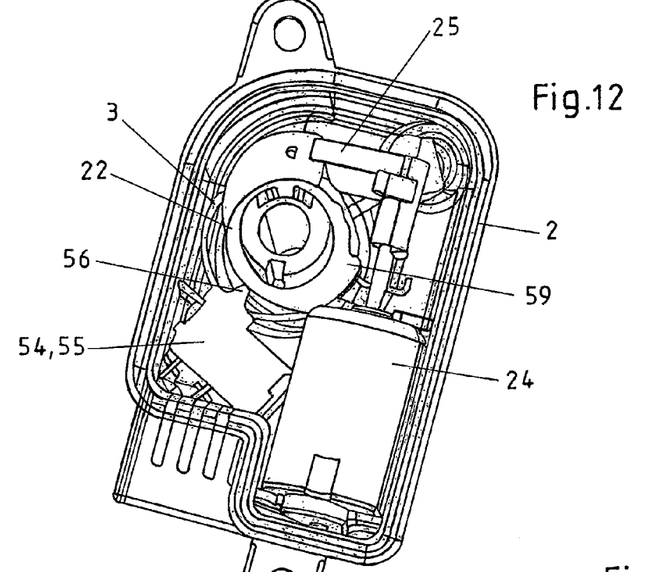

The object of FIG. 12 is the view into the housing 2 of the lock. The locking bolt is not illustrated here, but the pivoting lever 22 is recognisable. The switching mechanism 55 acting as a detection device 54, a microswitch, is assigned to the pivoting lever. The position reproduced here means that the fuel tank cap or tailgate is closed here, consequently the locking bolt not illustrated here and the pivoting lever 22 is located in the retracted, depressed position. In the illustration in accordance with FIG. 12, the pivoting lever 22 is in a position in which the switch 56 is not activated.

Figure 13:
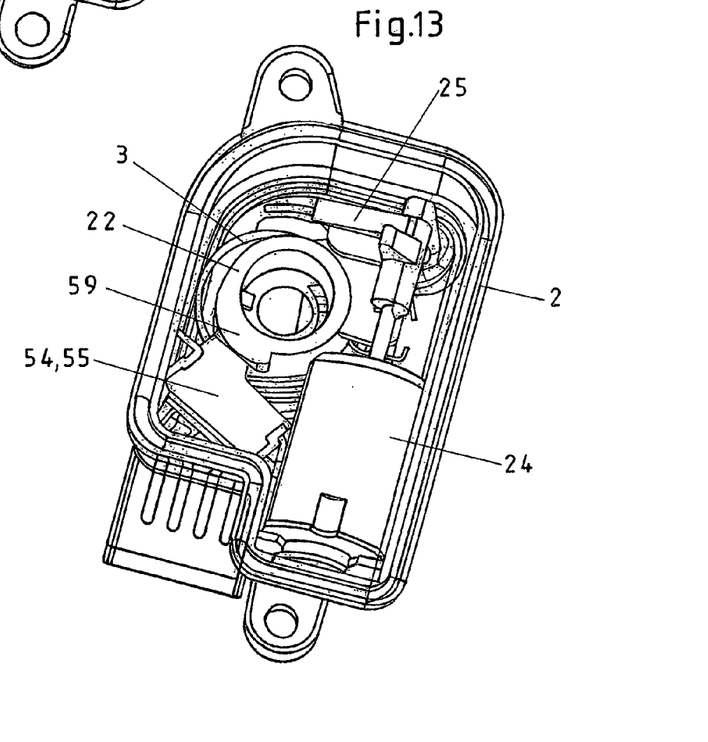

Unlike the illustration in accordance with FIG. 13, the flap is open here, the locking bolt not illustrated is located in the extended position. The pivoting lever 22 has a protrusion 59, i.e. the pivoting lever 22 projects into the area of the protrusion 59 somewhat. Consequently, contact with the switch depressed here 56 of the detection device 54 formed as a switching mechanism 55 during rotation occurs. Rotation occurs between the illustrations in accordance with FIG. 12 and FIG. 13.

Figure 14:
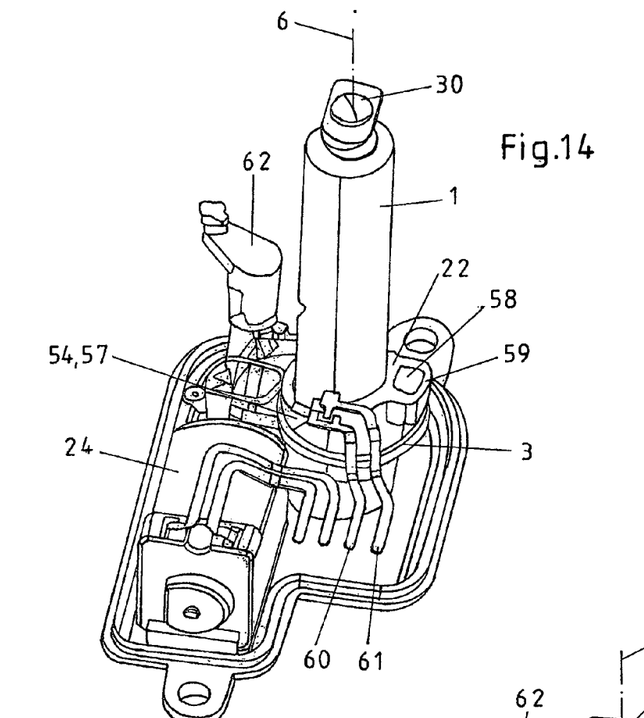

FIG. 14 shows the alternative solution with a detection device 54 formed by an echo sensor 57 and a permanent magnet 58. In the illustration in accordance with FIG. 14, the locking bolt 1 is depicted in the extended position; the fuel tank cap not illustrated here is open. There is no contact between the echo sensor 57 and the permanent magnet 58 integrated in the protrusion 59 of the pivoting lever 22.

Figure 15:
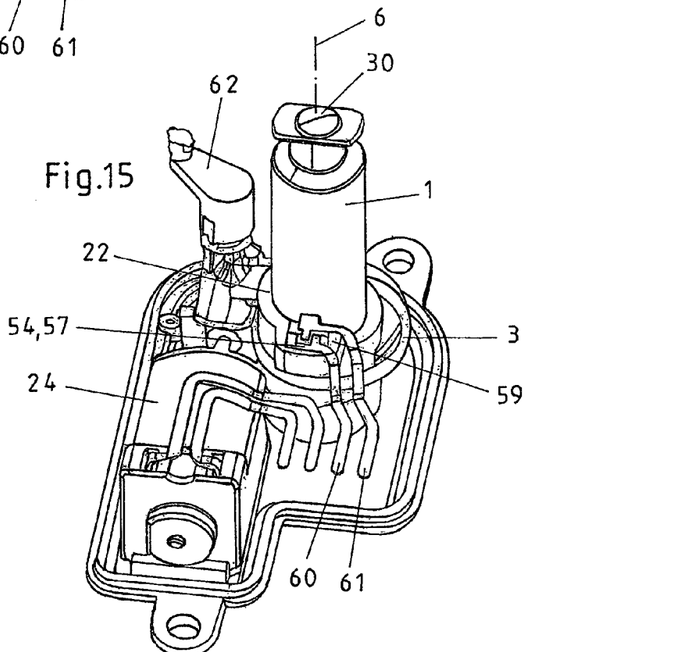

This has not changed in the illustration in accordance with FIG. 15. The fuel tank cap or tailboard which cannot be recognised is closed, i.e. the locking bolt 1 is in its retracted position after it has rotated around its longitudinal axis 6 in the process. This has led to the pivoting lever 22 also rotating, the permanent magnet 58 is concealed to the greatest possible extent by the echo sensor 57. By the localisation of the magnet 58 the echo sensor 57 therefore records the shifting of the locking bolt 1 between its extended and retracted position, whereby such a contactless interplay between the echo sensor 57 and the permanent magnet 58 as a detection device 54 is particularly suited if a comparatively small detection device is required. The reference sign 62 describes another mechanical emergency unlocking device.

Stamping grids 60 and 61 are also shown as they for example serve to control lighting not illustrated here in the area of the flap opening above the position of the locking bolt 1. The use of the lighting can thus be limited to states in which the fuel tank cap 14 is open and the locking bolt 1 is in its extended position as shown in FIG. 14.

Figures 16, 17:
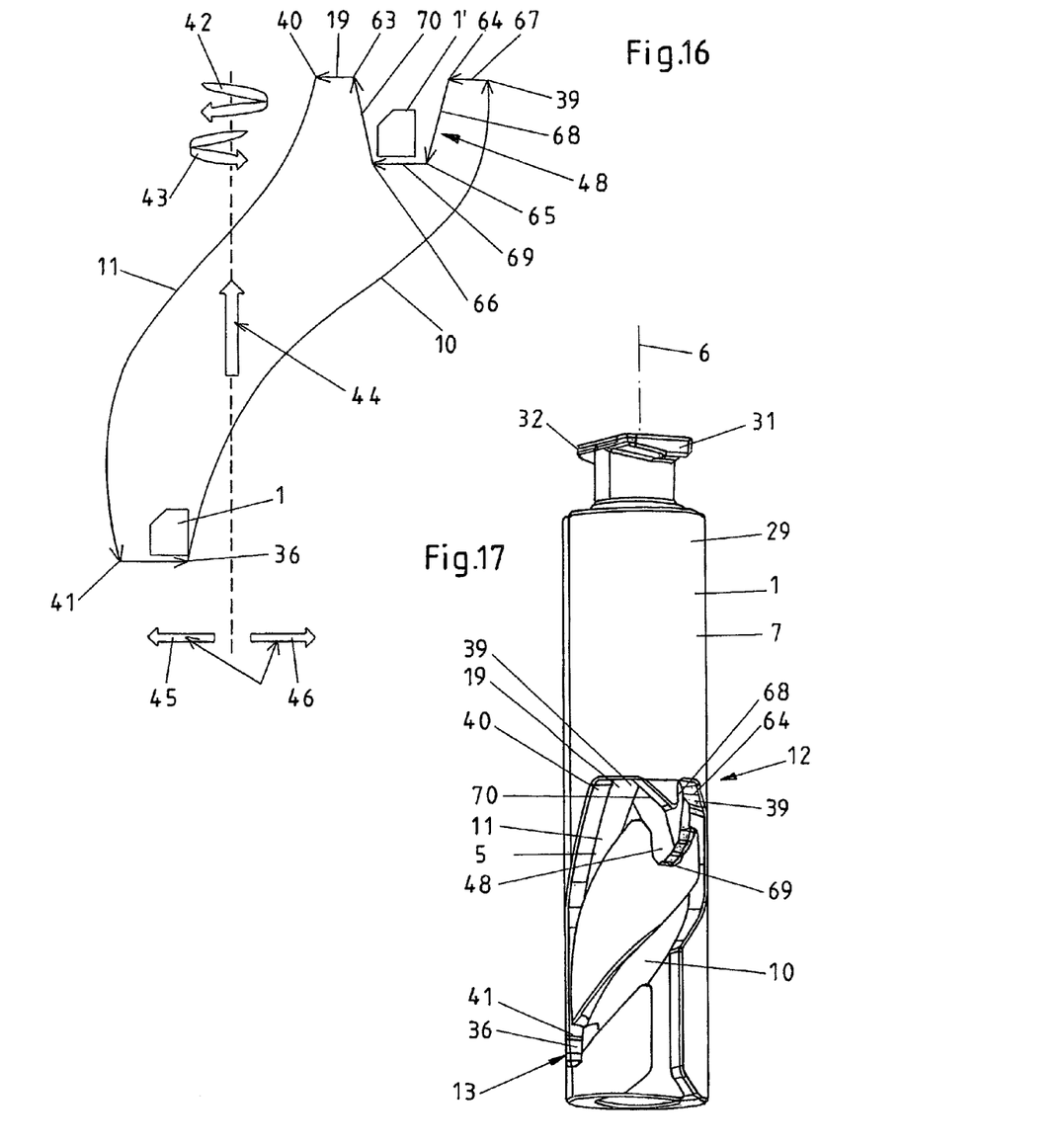

In an alternative illustration to FIG. 8, FIG. 16 shows the illustration of the mechanism during the shifting of the locking bolt 1, here with the gate section 48 additionally serving for securing purposes. The reference signs 36, 39, 64, 65, 66, 63, 40 and 41 illustrate a total of eight positions on the gate 5, as they depict the forcible actuation on the bolt side in interplay with the pin on the housing side which is not illustrated here. The position at the lower end of the gate 5 is marked with 36. If the pin now passes the diagonal section 10 on activation of the locking bolt 1 from the extended open position into the retracted closed position, it goes into position 39 by activation against the force of the torsion and compression springs. Only against the force of the latter does the pin reach the point marked with the reference sign 64 in the direction of the arrow 67. This is where the gate section 48 begins to secure a holding position of the locking bolt in its closed state. The passage of this gate section is symbolised by arrows 68, 69 and 70. The gate section 48 demonstrates a V-shape, whereby the two handles 70 and 68 of the gate section 48 are still connected to one another via a horizontal section 69. It is obvious in this illustration that it is practically excluded that the pin leaves the basin-like gate section 48 insofar as the locking bolt 1 is not consciously activated in a relevant manner. It is not illustrated that the pin reaches position 65 from position 64 fundamentally by means of the assistance of a rubber seal, for example, on the fuel tank cap or tailboard. The locking bolt 1 then reaches position 66 from position 65 via the torsion spring in the direction of the arrow 66.

FIG. 17 shows the lock with the security section itself. Here too, a total of 8 positions are marked with the reference sign 36, 39, 64, 65, 66, 63, 40 and 41. If the non-illustrated pin does not pass the diagonal section when the locking bolt is retracted, it initially goes into position 39 and then into position 64 via the horizontal section 67. The gate section 48 is connected for security, consisting of the two V-shaped flanks 68 and 70 arranged to one another, connected by a further horizontal section 69, which depicts the secured closed position. Positions 63 and 40 are connected to the flank 70 of the gate section 48, connected via the horizontal section 19, until the pin then goes into position 41 again at the lower end 13 of the gate 5 via the diagonal 11.

The invention claimed is:

1. Lock for a fuel tank cap or tailboard in a vehicle, the lock comprising:
    a locking bolt which can be shifted between an open and closed position by opening and closing the fuel tank cap or tailboard;
    a compression spring and a torsion spring, wherein the locking bolt is forcibly actuated against a force of the compression spring in a direction of a longitudinal axis of the locking bolt, and against a force of the torsion spring around the longitudinal axis, when the locking bolt is shifted from the open position to the closed position; and
    wherein the locking bolt comprises a housing including a self-contained gate in a lateral surface of the housing, and the lock further comprises a pin that interacts against the gate to force the locking bolt in the direction around the longitudinal axis against the torsion spring.

2. Lock in accordance with claim 1, wherein the gate has two diagonal sections, opposite one another.

3. Lock in accordance with claim 2, wherein a gate section is provided at an upper end of the gate between the two diagonal sections to secure a holding position of the locking bolt (1) in the closed position.

4. Lock in accordance with claim 3, wherein the gate section is fundamentally v-shaped.

5. Lock in accordance with claim 2, wherein the diagonal sections at the upper end (12) and/or at a lower end of the gate are connected by a transition with a horizontal section and a vertical section.

6. Lock in accordance with claim 1, wherein a bearing of the torsion spring in the housing of the lock enables the exertion of pre-tension in both directions of action of the torsion spring.

7. Lock in accordance with claim 6, wherein the torsion spring is formed as a support on the housing of the lock and the locking bolt and/or a pivoting lever firmly connected to the locking bolt.

8. Lock in accordance with claim 7, further comprising a ratchet equipped with a drive that serves to lock the fuel tank cap or tailboard which blocks the pivoting lever or fits closely to the pivoting lever when the fuel tank cap or tailboard is locked.

9. Lock in accordance with claim 8, wherein the ratchet is held in the closed position by a spring.

10. Lock in accordance with claim 1, wherein the lock is equipped with a detection device for detecting a state of opening of the fuel tank cap or tailboard.

11. Lock in accordance with claim 10, wherein the detection device comprises a switching mechanism which records a position of the locking bolt.

12. Lock in accordance with claim 11, wherein the detection device further comprises an echo sensor in conjunction with a permanent magnet, whereby the echo sensor (57) or the permanent magnet is assigned to the locking bolt and/or the pivoting lever.

* * * * *